(12) United States Patent  
Marcu

(10) Patent No.: US 8,717,553 B1  
(45) Date of Patent: May 6, 2014

(54) POSITIONING A FIRST SURFACE IN A PRE-DETERMINED POSITION RELATIVE TO A SECOND SURFACE

(75) Inventor: Gabriel G. Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2306 days.

(21) Appl. No.: 10/663,574

(22) Filed: Sep. 16, 2003

(51) Int. Cl.
*G01B 11/26* (2006.01)

(52) U.S. Cl.
USPC .................................................. 356/152.1

(58) Field of Classification Search
USPC .............. 356/152.1, 3.01–3.15, 4.01–4.1, 356/5.01–5.15, 6–22
See application file for complete search history.

(56) References Cited

U.S. PATENT DOCUMENTS

| | | | | |
|---|---|---|---|---|
| 4,225,241 A | * | 9/1980 | Dandliker et al. | 356/400 |
| 4,480,912 A | * | 11/1984 | Snyder, Jr. | 356/138 |
| 4,690,556 A | * | 9/1987 | Walker | 356/141.3 |
| 4,764,010 A | * | 8/1988 | Bachmann et al. | 356/153 |
| 5,026,998 A | * | 6/1991 | Holzl | 250/559.37 |
| 5,872,623 A | * | 2/1999 | Stabile et al. | 356/73 |
| 5,953,114 A | * | 9/1999 | Spink et al. | 356/152.1 |
| 6,154,522 A | * | 11/2000 | Cumings | 378/206 |

OTHER PUBLICATIONS

Adept Technology, Inc., "Automation Builder," pp. 1-4, http://www.adept.com/main/Marketing, 2003.

Adept Technology, Inc., "Products—C-40/C-60 Controller System Examples," pp. 1-3, http://www.adept.com/main/products, 2003.
Adept Technology, Inc., "Products—Robots," pp. 1-2, http://www.adept.com/main/products/robots, 2003.
Adept Technology, Inc., "Flexible factory automation, robots, modules, controls and software," p. 1, http://www.adept.com/main/index.html, 2003.
"A Comparison of Application Sharing Mechanisms in Real-Time Desktop Conferencing Systems," by S. R. Ahuja, et al; AT&T Bell Laboratories; 1990.
"A Distributed Architecture for Multimedia Conference Control," by Eve Schooler, ISI Research Report (Nov. 1991).
"A Packet-Switched Multimedia Conferencing System," by Eve Schooler, et al; ACM SIGOIS Bulletin, vol. 1, No. 1, p. 12-22 (Jan. 1989).
"An Architecture for Multimedia Connection Management," by Eve Schooler, et al; Proceedings IEE 4th COMSOC International Workshop on Multimedia Communications; MM '92, pp. 271-274 (Apr. 1992).
"An Experiment in Integrated Multimedia Conferencing," by Keith Lantz; Department of Computer Science, Stanford University, 1986.
"Architecture of Heiphone: A Testbed for Audio/Video Teleconferencing," by Thomas Kaeppner, et al; IBM European Networking Center, 1998.
"Case Study: Multimedia Conference Control in a Packet-Switched Teleconferencing System," Journal of Internetworking: Research and Experience; Vol. 4, p. 99-120 (Jun. 1993).
"CERC Technical Report Series Research Note," by Kankanahalli Srinivas, et al; Concurrent Engineering Research Center; Feb. 1992.

(Continued)

*Primary Examiner* — Luke Ratcliffe

(57) ABSTRACT

A method and an apparatus for positioning a first device in relation to a second device. An optical signal from a first device is sent to a second device. A reflection of the optical signal from the second device is received. A position of one of the devices relative to the other device is adjusted based upon the reflection.

27 Claims, 6 Drawing Sheets

(56) References Cited

OTHER PUBLICATIONS

"Collaboration Awareness in Support of Collaboration Transparency: Requirements for the Next Generation of Shared Window Systems," by J. Chris Lauwers, et al; 1990 CHI '90 Proceedings.

"CSCW '92 Demonstrations," by Michael Muller, et al; Nov. 1992.

"Design of a Multi-Media Vehicle for Social Browsing," by Robert Root; Bell Communications Research; 1988.

"Distributed Multiparty Desktop Conferencing System: Mermaid," by Kazuo Watabe, et al; CSCW 90 Proceedings; Oct. 1990.

"Europarc'S Integrated Interactive Intermedia Facility (IIIF): Early Experiences," by Bull Buxton, et al; Elsevier Science Publishers B.V. (North-Holland); 11-34.

"Explorations into Real-Time Multimedia Conferencing," by Harry Forsdick; Computer Message System—85; 1986.

"High-Quality Multimedia Conferencing Through a Long-Haul Packet Network," by Chip Elliot, BBN Systems and Technologies, 1990.

"Kernal Support for Live Digital Audio and Video," by Kevin Jeffay, et al; in Proc. of the Second International Workshop on Network and Operating System Support for Digital Audio and Video, Nov. 1991.

"MM Conf: An Infrastructure for Building Shared Multimedia Applications," by Terrence Crowley, et al; CSCW 90 Proceedings (Oct. 1990).

"Multimedia—Principles, Systems and Applications," by Lars Kjelldahl, et al; Apr. 1991; Proceedings of the 1991 Eurographics Workshop on Multimedia Systems, Applications, and Interaction; Stockholm, Sweden.

"Multimedia Conferencing: Has It Come of Age?," by Eve Schooler, et al; Proceedings $24^{th}$ Hawaii International Conference on System Sciences, vol. 2, pp. 707-716 (Jan. 1991).

"N-Way Conferencing With Packet Video," by Stephen Casner, et al; The Third International Workshop on Packet Video, Mar. 22-23, 1990.

"One Is Not Enough: Multiple Views in a Media Space," by William Gaver, et al; Interchi; Apr. 24-29, 1993.

"Pandora—An Experimental System for Multimedia Applications," by Andy Hopper; Olivetti Research Laboratory, 1995.

"Piloting of Multimedia Integrated Communications for European Researchers," by P.T. Kirstein, et al; Proc. INET '93.

"Portholes: Supporting Awareness in a Distributed Work Group," by Paul Dourish, et al; Chi 1992; May 3-8.

"Realizing a Video Environment: Europarc'S Rave System," by William Gaver, et al; Ranx Xerox Cambridge Europarc; 1992.

"Real-Time Software-Based Video Coder for Multimedia Communication System," by Ho-Chao Huang, et al, Department of Computer Science and Information Engineering, 1993.

"Rendevous: An Architecture for Synchronous Multi-User Applications," by John Patterson, et al; CSCW Proceedings; Oct. 1990.

"Replicated Architectures for Shared Window Systems: A Critique," by J. Chris Lauwers, et al; Olivetti Research California 1990.

"System Support for Integrated Desktop Video Conferencing," by Amy Pearl; Sunmicrosystems Laboratories; Dec. 1992.

"Team Work Station: Towards a Seamless Shared Workspace," by Hiroshi; NTT Human Interface Laboratories; CSCW 90 Proceedings; Oct. 1990.

"The Connection Contorl Protocol: Architecture Overview," by Eve Schooler, et al; USC/Inormation Sciences Institute (Jan. 28, 1992).

"The Impact of Scaling on a Multimedia Connection Architecture," by Eve Schooler; ACM Journal of Multimedia Systems; vol. 1; No. 1; pp. 2-9 (1993).

"The Inria Videoconferencing System (IVS)," by Thierry Turletti; Oct. 1994.

"The Multi Media Workstation," by Dick Phillips; SIGGRAPH '89 Panel Proceedings.

"Touring Machine: A Software Platform for Distributed Multimedia Applications," by M. Arango, et al; 1992 IFIP International Conference on Upper Layer Protocols, Architectures and Applications, May 1992.

"Towards a Universal Directory Service," by Keith Lantz, et al; Department of Computer Science and Electrical Engineering; Stanford University, 1985.

"Videoconferencing as a Technology to Support Group Work: A Review of Its Failure," by Carmen Egido; Bell Communications Research; 1988.

"Zoned Analog Personal Teleconferencing," by Joseph Touch; USC/Information Sciences Institute, 1996.

* cited by examiner

POSITIONING A FIRST SURFACE IN A PRE-DETERMINED POSITION RELATIVE TO A SECOND SURFACE

BACKGROUND OF THE INVENTION

1. Field of the Invention

This invention relates generally to positioning a surface, and, more particularly, to positioning a first surface in a pre-determined manner relative to the positioning of a second surface.

2. Description of the Related Art

Innovations in the computer display area have resulted in dramatic improvements of products that are used for displaying computer input and output. Monitors attached to computers have progressively become more space efficient along with being brighter and having higher resolution. Portable computers have become even more practical due to the advancements made in the field of computer displays. Innovations in this area have produced very thin displays that utilize small amounts of real estate while providing a quality display of computer graphics. For example, thin displays, such as those that are based upon liquid crystal display (LCD) technology, have been utilized.

One of the issues relating to thin displays, such as LCD screens, relates to the brightness and the quality of sections of the LCD screens. For example, much work has been dedicated to improving the brightness of LCD displays. Also, a large amount of effort has been dedicated to providing displays that provide more accurate colors and brightness when viewed at particular angles.

One of the problems associated with the manufacture of LCD displays include manufacturing a number of LCD displays, such as LCD monitors, that have fairly consistent displays in terms of sharpness, contrast, color, and/or other features when viewed at various angles. When manufacturing LCD displays, a number of tests are performed on the various portions of the screen of the display for quality control. Testing instruments are generally oriented at various angles, such as in a perpendicular orientation, and testing is then performed on the LCD screens as part of the manufacturing and testing processes. For example, testing includes measuring various colors on LCD screens according to predetermined standards, such as the ISO 13406 Standard. Often, a perpendicular orientation of the test instrument to the screen of the LCD monitor is used.

The accuracy of the angle in relation to the test instrument and the LCD screen is important to the accuracy of the test performed on the display screen. One of the problems associated with the current methodology is that the test operator generally positions an instrument to the LCD screen utilizing approximations, which may cause delay and inaccurate test results. Additionally, a test angle used to analyze one LCD monitor may vary from the angle used to analyze another LCD monitor, thereby resulting in inconsistent test results of a batch of LCD monitors. Dedicating more time and resources to insure the accuracy of the angle between the test instrument and the LCD screen may cause inefficiencies (e.g., inaccurate testing, repeating screen adjustments, etc.) during the manufacturing and testing of computer displays, such as LCD monitors.

The present invention is directed to overcoming, or at least reducing, one or more of the problems set forth above.

SUMMARY OF THE INVENTION

In one aspect of the present invention, a method is provided for positioning a first apparatus in relation to a second apparatus. An optical signal from a first apparatus is sent to a second apparatus. A reflection of the optical signal from the second apparatus is received. A position of one of the apparatuses relative to the other apparatus is adjusted based upon the reflection.

In another aspect of the present invention, a system is provided for positioning a first apparatus in relation to a second apparatus. The system of the present invention includes an optical source affixed to the first apparatus. The optical source is provided for directing an incident light to the second apparatus. The system of the present invention also includes a light receiving unit to receive reflective light reflected from the second apparatus. The reflective light is used to adjust the positioning of the first apparatus in relation to the second apparatus.

In another aspect of the present invention, an apparatus is provided for positioning a first device in relation to a second device. The apparatus of the present invention includes an optical source affixed upon the first device. The optical source includes a screen. The optical source is capable of providing an incident light that is directed towards the second device, from which a reflected light is received upon the screen. The apparatus is also capable of adjusting the relative positioning between the first and second devices based upon an angle of the reflected light.

In yet another aspect of the present invention, a system is provided for positioning a testing unit in relation to a computer display. The system of the present invention includes a testing unit for performing a test upon the computer display or a television screen. The system of the present invention also includes an optical source affixed to the testing unit. The optical source is provided for directing an incident light to the computer display. The system of the present invention also includes a light receiving unit for receiving reflective light reflected from the computer display. The location of the light receiving unit upon which the reflective light is received is used to adjust the positioning of the testing unit in relation to the computer display.

BRIEF DESCRIPTION OF THE DRAWINGS

The invention may be understood by reference to the following description taken in conjunction with the accompanying drawings, in which like reference numerals identify like elements, and in which.

Figure 1:
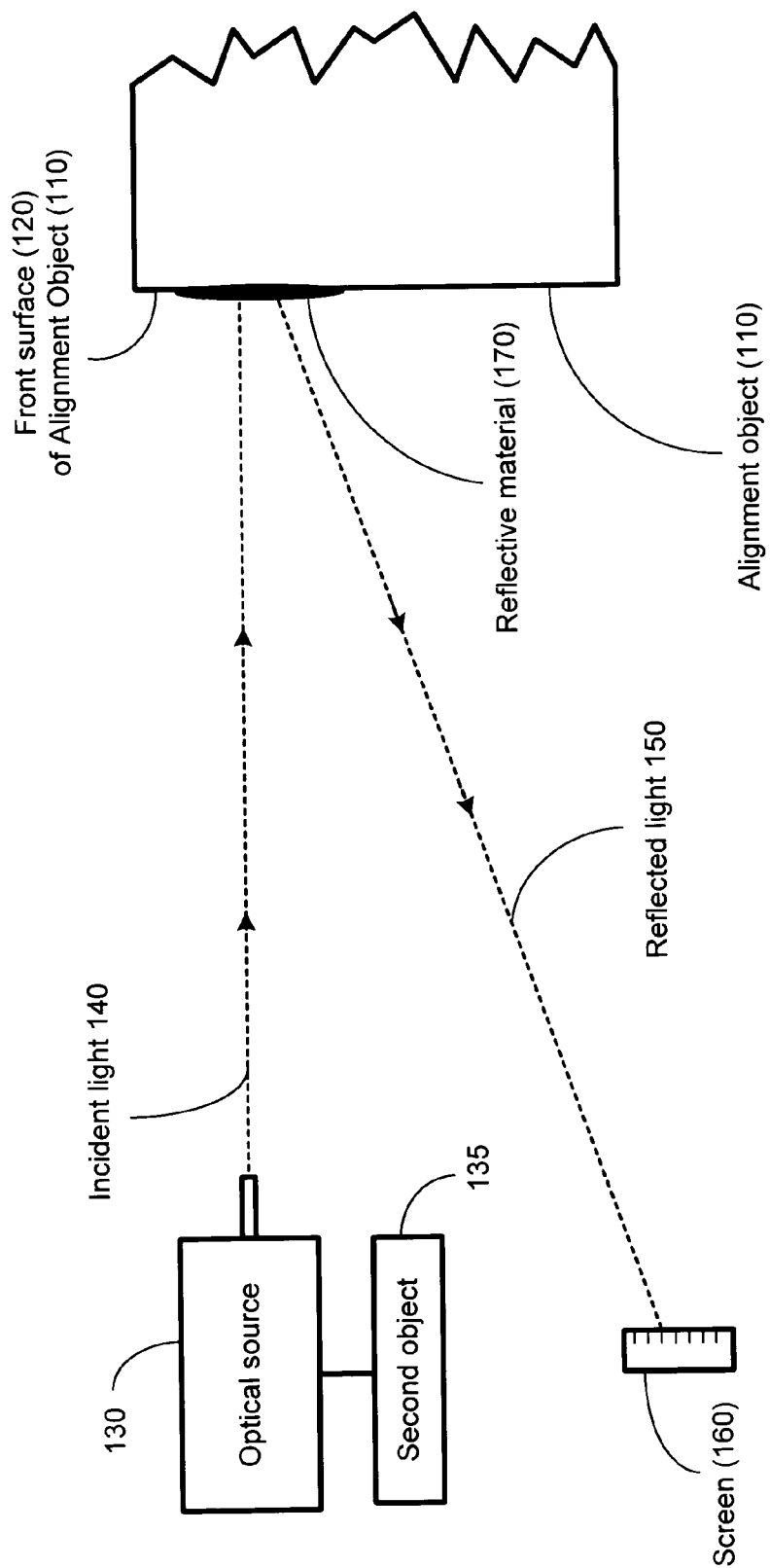
FIG. 1 provides a depiction of an implementation of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a method and an apparatus for positioning a first device in relation to a second device. For example, the first device may be a measuring instrument or a test instrument that is aligned or positioned in relation to a second device, such as the LCD screen of a computer display and/or a television screen. Therefore, the measuring instrument can be aligned more accurately, such that consistent testing of various LCD screens may be performed, thereby increasing the efficiency of testing of computer displays.

Embodiments of the present invention provide for an optical source that is affixed to a test instrument wherein a light source (e.g., a laser) is pointed towards a subject, such as the LCD screen, which may contain a reflective material (e.g., a mirror) affixed upon its surface. The light is then reflected back to a screen that may be affixed to the test instrument or the optical source. Therefore, the orientation of the reflected light upon the screen may be used to more accurately align or position the measuring instrument in relation to the LCD screen.

Embodiments of the present invention may be used for various other applications where an alignment of one object is performed in relation to another object. For example, during construction of structures, such as bridges, buildings, etc., one object may be aligned with a second object, such as a wall, a support column, or the like. The angular relationship between the two objects may be more accurately deciphered utilizing the light source and the reflected light positioning on a screen provided by embodiments of the present invention. Although for clarity of the description, portions of the invention are described in terms of the embodiment of a test source and a LCD screen, the embodiments of the present invention may be used for a variety of applications and remain within the scope and the spirit of the present invention.

Turning now to FIG. 1, a depiction of an implementation of one embodiment of the present invention is illustrated. FIG. 1 illustrates an alignment object 110 that is to be aligned with an optical source 130. The optical source 130 may be affixed to a second object 135, such as a testing device, that is positioned relative to the alignment object. In one embodiment, the alignment object 110 may be an LCD screen, which may be tested by the testing device. In alternative embodiments, the alignment object 110 may be a wall, a support column, or any other object upon which alignment with the second object 135 is desired. The alignment object 110 comprises a front surface 120, which may be positioned relative to the second object 135. A reflective material 170 may be affixed upon the front surface 120 of the alignment object 110. The affixation of the reflective material 170 may be performed in a variety of manners, such as magnetic means, adhesive means, or other means known to those skilled in the art having benefit of the present invention.

The optical source 130 is capable of providing an incident light 140 that is directed towards the front surface 120 of the alignment object 110. The incident light 140 may be a light beam, a laser beam (e.g., such as a diode laser beam or any other type of laser), or any other type of light source. The optical source 130 provides the incident light 140, which is directed towards the reflective material 170 that is placed upon the alignment object 110. The reflective material 170 may be a mirror or other type of reflective material that may be utilized by those skilled in the art having benefit of the present disclosure.

The incident light 140 is reflected by the reflective material 170 to provide a reflected light 150. The reflected light 150 may then be received by a screen 160. The screen 160 may be of a variety of materials that are capable of absorbing a portion of the reflected light 150. The screen 160 may be coupled to the optical source 130 or may be positioned at a known relative position from the optical source 130. The screen 160 may be used to align the optical source 130 with the front surface 120 of the alignment object 110. Based upon the position of the reflected light 150 on the screen 160, the optical source 130 may be adjusted such that the alignment between the optical source 130 and the alignment object 110 is positioned at a desired angle in relation to the second object 135. The screen 160 may comprise various types of markings that may be used to adjust the position of the optical source 130 until the reflected light 150 is directed towards a desired marking on the screen 160, which allows one to align the optical source 130 and the second object 135 at a desired angle in relation to the alignment object 110. The adjustments of the positioning of the optical source 130 in relation to the alignment object 110 may be performed using a manual adjustment process by an operator, or performed automatically using a feedback control system, which may employ one of a variety of control systems, such as a Servo Control System known to those skilled in the art (an example of a servo control system is the Cobra 600 C-60® servo control system, publicly offered by Adept Technology, Inc., of Livermore, Calif., U.S.A.)

Figure 2:
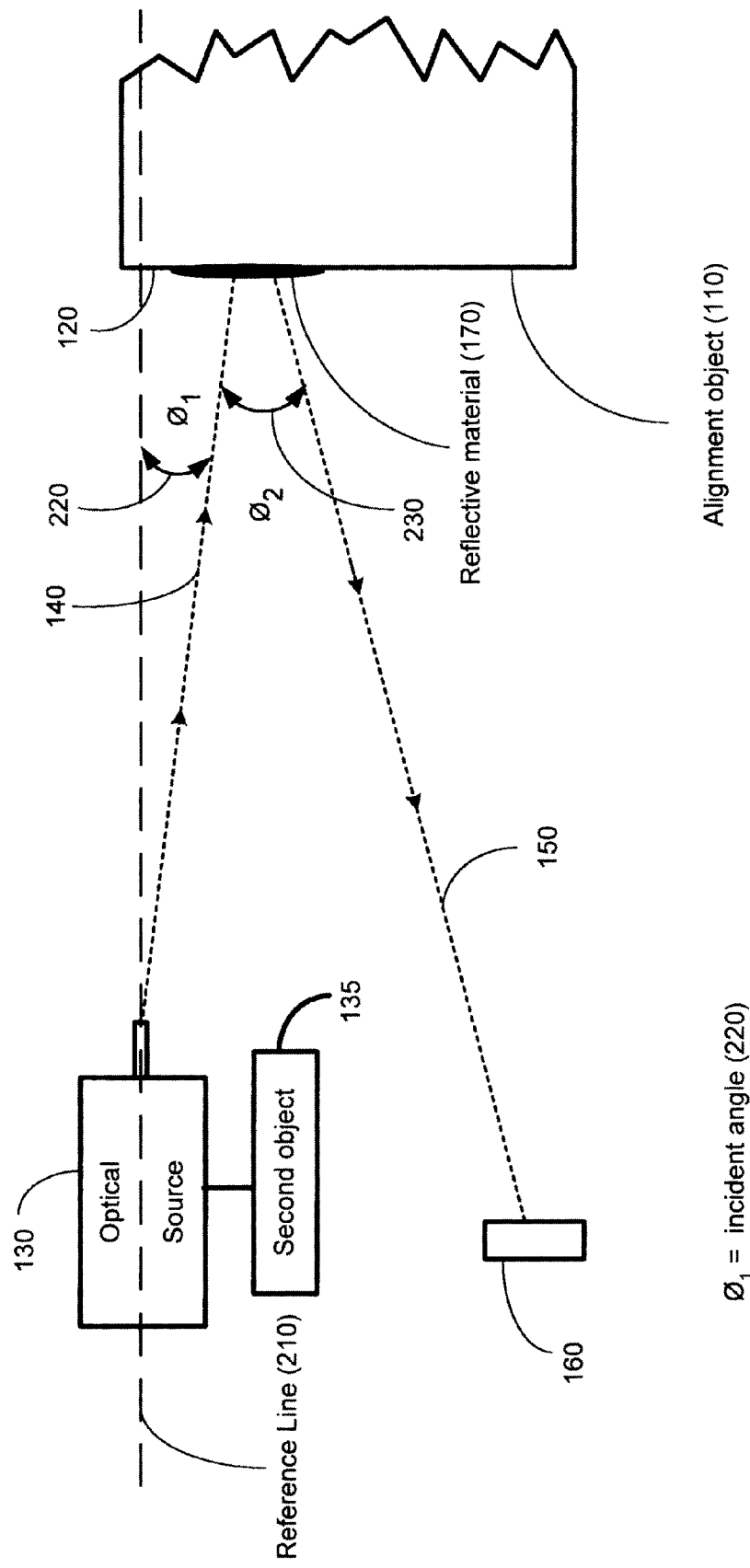
FIG. 2 provides a depiction that illustrates the angles of the incident light and the reflected light, in accordance with an illustrative embodiment of the present invention.

Turning now to FIG. 2, a depiction illustrating the angles of the incident light 140 and the reflected light 150 is provided. FIG. 2 illustrates a reference line 210 that may be utilized to determine the positioning of the optical source 130 and the second object 135, in relation to the alignment object 110. A reference line 210 may be based upon a reference in relation to the front surface 120 of the alignment object 110. Initially, the optical source 130 may be positioned in relation to the reference line 210, and using this reference, an incident light 140 is directed towards the reflective material 170 on the front surface 120 of the alignment object 110. Therefore, the incident light 140 may be at an incident angle 220 ($\phi_1$) in relation to the reference line 210. If a perpendicular orientation between the second object 135 and the alignment object 110 is desired, the initial incident angle 220 may be approximately zero. A reflective angle 230 ($\phi_2$) may be defined as the angle between the incident light 140 and the reflected light 150, which is received by the screen 160. Various markings written on the screen 160 may be utilized to determine the incident angle 220 based upon the reflective angle 230. In other words, the reflected light 150 and the reflective angle 230 may be used to position the optical source 130 to a desired incident angle 220.

Figure 3:
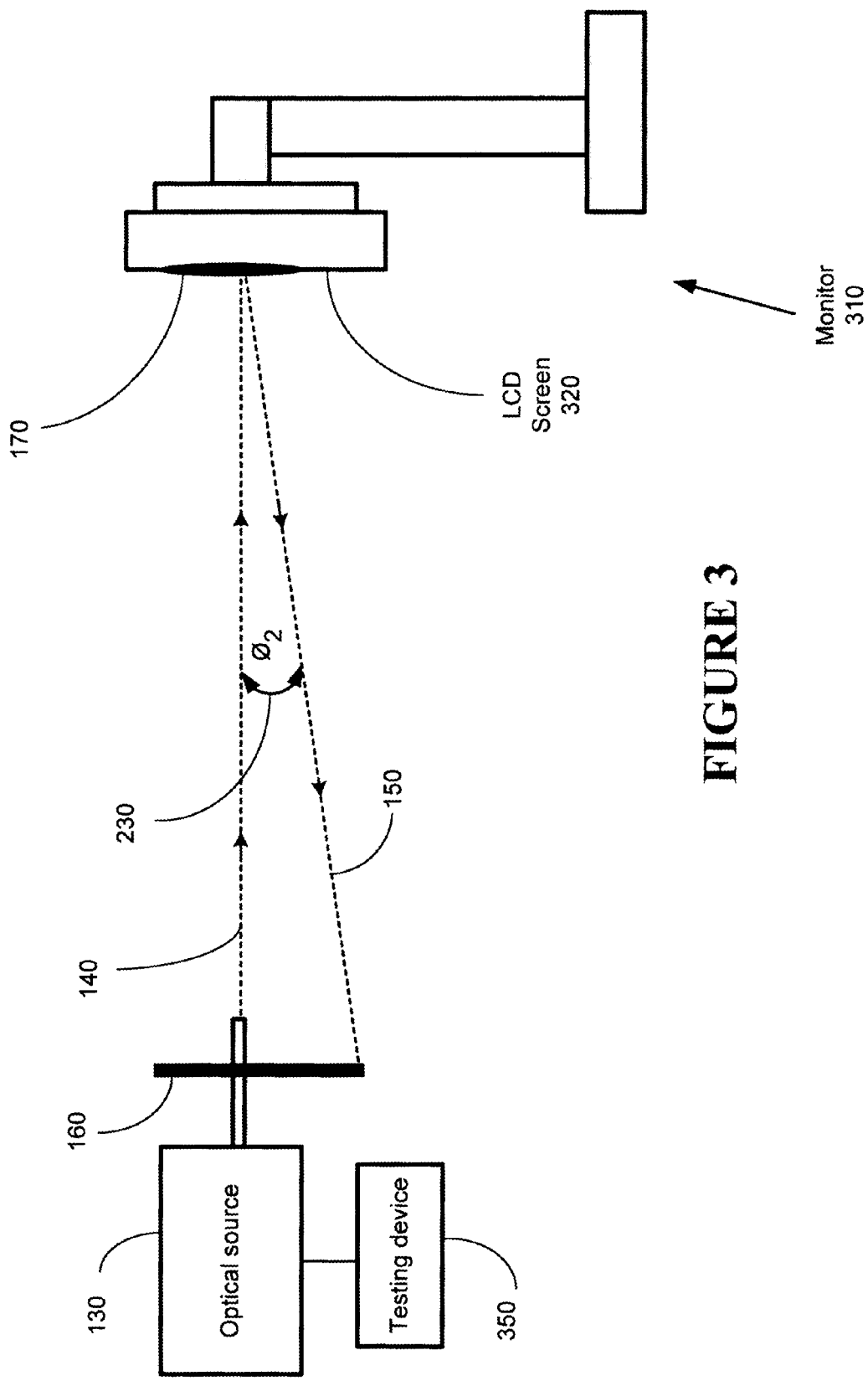
FIG. 3 provides a depiction of an implementation of one embodiment of the present invention in the context of testing a computer display device, in accordance with an illustrative embodiment of the present invention.

Turning now to FIG. 3, a depiction of one embodiment of the present invention is illustrated utilizing an LCD monitor. FIG. 3 illustrates a computer display device 310 (e.g., monitor 310), such as an LCD monitor, whose screen 320 may be tested using a testing device 350. In one embodiment, the monitor 310 may be a television screen. The testing device 350 may be a measurement device, such as photometers, radiometers, and the like. The monitor 310 may be the monitor 310 of a desktop computer or a portable computer and other types of computer displays, such as the screen on the iMac® offered by Apple, Inc. The optical source 130 is affixed to the testing device 350. The optical source 130 may be affixed to the testing device 350 in a variety of manners, such as adhesive attachments, mechanical attachments, or any other types of attachments. Additionally, the screen 160 may be positioned on the optical source 130. For example, the screen 160 may be positioned in front of the optical source 130 such that reflected light 150 received by the screen 160 is very close to the optical source 130.

The alignment of the testing device 350 in relation to the monitor 310 may be performed in an efficient and accurate manner using the optical source and the reflected light 150 received by the screen 160. The optical source 130 provides the incident light 140, which is directed towards the reflective material 170 that is affixed on the screen 320 of the monitor 310. The reflected light 150 from the reflective material 170 is then received by the screen 160. Based upon the position of the reflected light 150 on the screen 160, the desired incident angle 230 may be achieved. For example, if the testing device 350 is to be substantially perpendicular to the LCD screen 320 of the monitor 310, the reflective angle 230 may be arranged such that it is substantially zero. Utilizing this method, consistent measurement of a plurality of monitors 310 may be performed with a predictable margin of error of the reflective angle 230. Therefore, using embodiments of the present invention, consistent evaluation of various LCD screens 320 of various monitors 310 may be performed.

Figure 4:
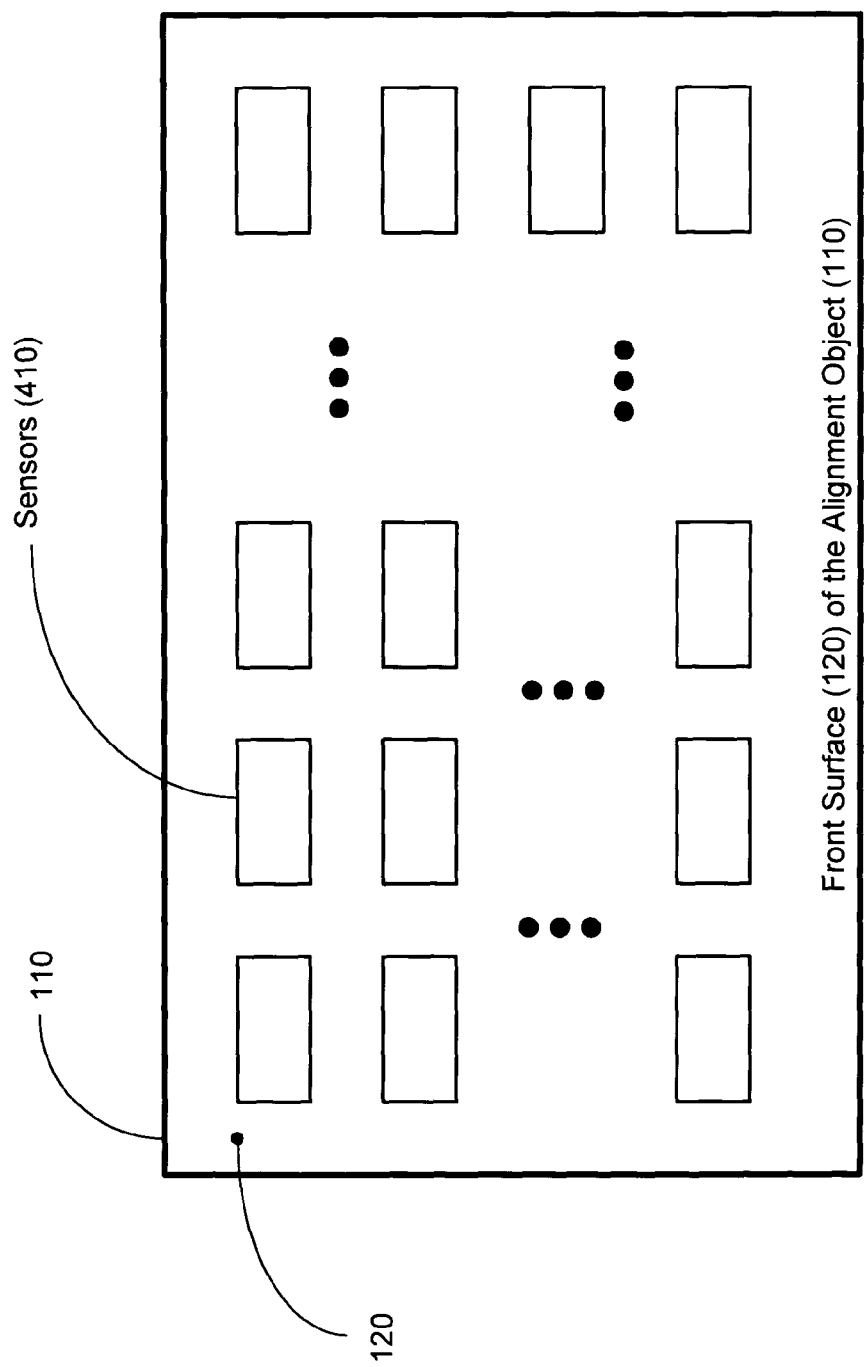
FIG. 4 provides an illustration of an alternative implementation front surface of an alignment object of FIG. 1, in accordance with an illustrative embodiment of the present invention.

Turning now to FIG. 4, an alternative embodiment of the implementation of the surface of the alignment object 110 is illustrated. In one embodiment, the front surface 120 of the alignment object 110 may comprise a plurality of sensors 410. These sensors 410 may be photo-sensors or other types of sensors 410 that are capable of detecting the incident light 140. For example, the sensors 410 may comprise an opto-coupler circuit wherein a signal is asserted to logic high or to logic low, based upon light detected by the opto-coupler circuit in the sensors 410. The sensors 410 may be positioned in a variety of manners on the front surface 120 of the alignment object 110. A plurality of sensors 410, such as an array of sensors 410, may be placed on the front surface 120. Therefore, the incident light 140 from the optical source 130 may be directed towards one of a number of sensors 410 on the front surface 120 of the alignment object 110, wherein the orientation of the optical source 130, or any other object affixed to the optical source 130, may be efficiently determined.

Figure 5:
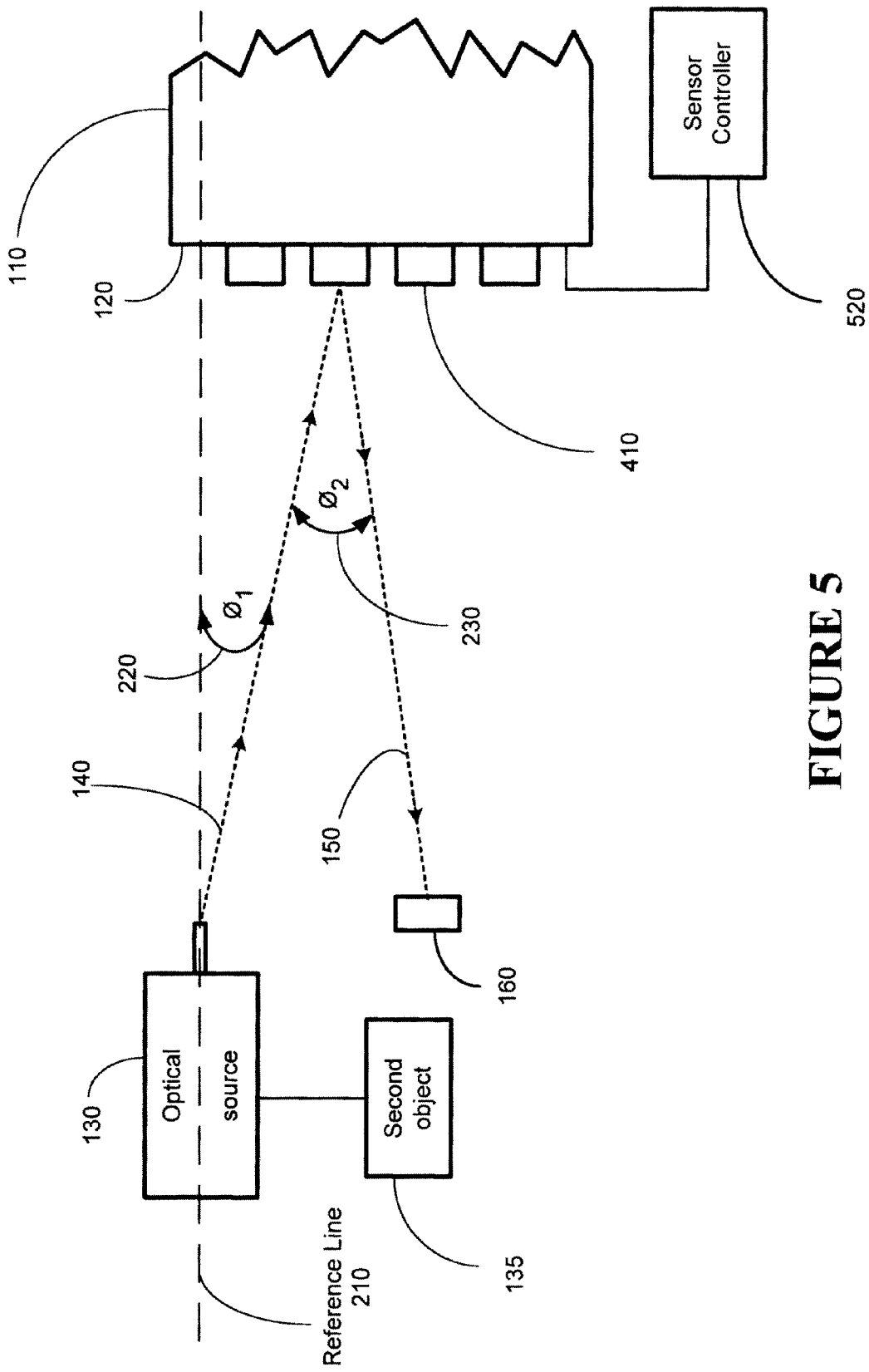
FIG. 5 provides an illustration of an implementation of an embodiment of the present invention using the sensors of FIG. 4, in accordance with an illustrative embodiment of the present invention.

Turning now to FIG. 5, an implementation of the embodiment utilizing the sensors 410 of FIG. 4 is illustrated. FIG. 5 illustrates an alignment object 110 that comprises a plurality of sensors 410 on the front surface 120 of the alignment object 110. The second object 135, which is to be aligned in relation to the alignment object 110, is affixed to the optical source 130. The optical source 130 provides an incident light 140 that is at an incident angle 220 in relation to the reference line 210. FIG. 5 illustrates two methods of determining the position of the second object 135 in relation to the alignment object 110. In one embodiment, the sensor 410 that receives the incident light 140 may provide either a reflective light 150 or another light generated by the sensor 410 towards the screen 160. Therefore, this reflected or secondary light 150 generated by the sensor 410 may be at a reflected angle 230, which then can be adjusted by moving the second object 135 along with the optical source 130 to achieve a desired orientation between the second object 135 and the alignment object 110.

In an alternative embodiment, the sensors 410 that receive the incident light 140 may activate a signal that is received by the sensor controller 520. Based upon which sensor 410 asserts the received signal that indicates that an incident light 140 has been received, the sensor controller 520 is capable of determining the incident angle 220. Based upon information from the sensor controller 520, the position of the second object 135, along with the optical source 130, may be adjusted such that a different incident angle 220 is achieved and a different sensor 410 on the front surface 120 of the alignment object 110 is activated, the signal from which is detected by the sensor controller 520. Utilizing a progressive, iterative-type process, a desired orientation of the second object 135 to the alignment object 110 may be performed. The sensors 410 may be placed on a variety of types of alignment objects 110, such as on computer monitors, construction walls, support columns, and the like.

Figure 6:
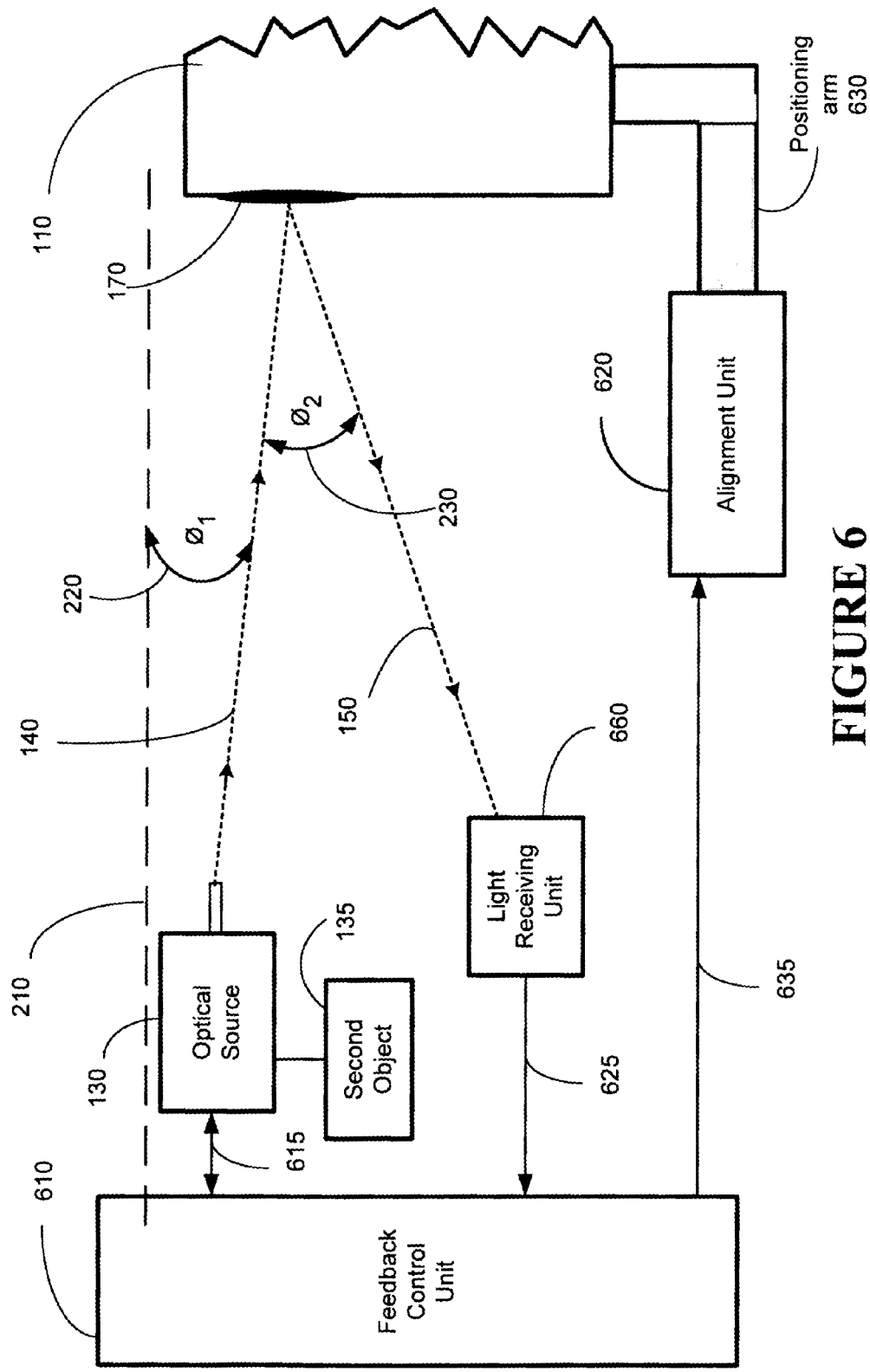
FIG. 6 provides a depiction of an implementation of one embodiment of the present invention using a feedback control system, in accordance with an illustrative embodiment of the present invention.

Turning now to FIG. 6, an implementation of the present invention utilizing a feedback control process is illustrated. FIG. 6 also illustrates an optical source 130 that is affixed to the second object 135. FIG. 6 also illustrates a feedback control unit 610, which is capable of performing feedback control to align the second object 135 with the alignment object 110 to a desired orientation. The feedback control unit 610 may comprise a computer system, a controller, a microcontroller, a processor, or other electronic circuitry (hardware, software, firmware, or a combination of two or more) that can detect and generate signals to control the alignment of the second object 135 with the alignment object 110.

The feedback control unit 610 is capable of controlling the operation of an alignment unit 620. The alignment unit 620 may comprise a control system that may be used to position the alignment object 110. The alignment unit 620 may comprise a motor, such as a servo motor that may be utilized to operate a positioning arm 630, which may be used to control the alignment of the alignment object 110. An example of a servo motor is a 750 Watts servo motor, publicly offered by Adept Technology, Inc., of Livermore, Calif., U.S.A. In an alternative embodiment, the alignment unit 620 may be used to control the positioning of the second object 135. The feedback control unit 610 may send control signals to the alignment unit 620 via a line 635.

The optical source 130 provides an incident light 140 that is at an incident angle 220 in relation to the reference line 210. The incident light 140 is then reflected by the reflective material 170 to produce a reflected light 150, which is at a reflective angle 230 in relation to the incident light 140. The reflected light 150 is then received by a light receiving unit 660. The light reflecting unit 660 may comprise a screen 160. The light reflecting unit 660 may also comprise a device that contains electronic circuitry, such as an opto-coupler and related electrical circuitry to provide a signal indicative of the position on the screen 160 upon which the reflected light 150 has been received. This signal may be sent to the feedback control unit 610 on a line 625.

The feedback control unit 610 is capable of calculating the incident angle 220 and/or the reflective angle 230 based upon the signal received on the line 625 from the light reflecting unit 660, which provides information as to which position on the screen 160 received the reflected light 150. The feedback control unit 610, in response to receiving the signal indicative of the position of the reflective light 150, determines the position of the optical source 130 and the second object 135. Based upon the angle 220, 230, the feedback control unit 610 may calculate an adjustment that is to be performed on the alignment object 110. Accordingly, this calculation may be used to provide a control signal on the line 635 to the alignment unit 620 to change the relative orientation of the alignment of the alignment object 110. The alignment unit 620 then utilizes the positioning arm 630 to position the alignment object 110. Therefore, a feedback loop may be created until the desired relative orientation of the second object 135 to the alignment object 110 is achieved.

Utilizing embodiments of the present invention, alignment of multiple objects may be achieved. Therefore, alignment of a tester that tests LCD screens may be aligned consistently on a plurality of LCD screens or television screens to achieve consistent and accurate test results. Utilizing embodiments of the present invention, feedback systems may be used to automatically align multiple objects. Additionally, relative positioning/alignment of larger scale objects, such as construction walls, bridge structures, support columns, and other structures may be analyzed using embodiments of the present invention. Embodiments of the present invention may be utilized in a variety of manufacturing, construction and other types of arenas where alignment of objects is desired.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    sending an optical signal from a first apparatus to a second apparatus based upon an incident angle;
    receiving a reflection having a reflected angle of said optical signal from said second apparatus on a screen; and
    adjusting a position of one of said apparatuses relative to the other apparatus by adjusting said incident angle based upon said reflection based upon a measurement of the received reflection by at least one of a photometer and a radiometer.

2. The method of claim 1, wherein sending said optical signal from said first apparatus to said second apparatus further comprises sending said optical signal from an optical source affixed upon said first apparatus.

3. The method of claim 2, wherein sending said optical signal from said first apparatus to said second apparatus further comprises directing an incident light from said optical source based upon a predetermined incident angle.

4. The method of claim 3, wherein an optical signal from said first apparatus to said second apparatus further comprises directing an incident light from said optical source to a reflective material affixed upon said alignment object.

5. The method of claim 4, wherein adjusting said position of one of said apparatuses relative to the other apparatus based upon said reflection further comprises adjusting said incident angle.

6. The method of claim 1, wherein adjusting said position of one of said apparatuses relative to the other apparatus based upon said reflection further comprises adjusting the incident angle to change a location on the screen upon which said reflective light is received.

7. A system for positioning a first apparatus in relation to a second apparatus, comprising:
    an optical source affixed to said first apparatus, said optical source for directing an incident light to said second apparatus; and
    a light receiving unit to receive reflective light reflected from said second apparatus, said light receiving unit comprising a circuit to detect a position of said reflective light, said position of said reflective light being used to adjust the positioning of said first apparatus in relation to the second apparatus, wherein said first apparatus is a testing device and wherein said testing device is at least one of a photometer and a radiometer.

8. The system of claim 7, wherein said light receiving unit comprises a screen to receive said reflective light.

9. The system of claim 8, wherein said screen comprises a plurality of markings to provide a location on said screen upon which the reflective light is received.

10. The system of claim 9, wherein said light receiving unit comprises means for providing a signal that is indicative of said location on said screen upon which the reflective light is received.

11. The system of claim 7, wherein said second apparatus is a computer display device.

12. The system of claim 11, wherein said computer display device comprises a liquid crystal display (LCD) screen.

13. The system of claim 7, further comprising a reflective material affixed upon said second apparatus for providing said reflective light.

14. The system of claim 13, wherein said reflective material comprises a mirror.

15. An apparatus, comprising:
    means for sending an optical signal from a first apparatus to a second apparatus based upon an incident angle;
    means for receiving a reflection having a reflected angle of said optical signal from said second apparatus on a screen; and
    means for adjusting a position of one of said apparatuses relative to the other apparatus by adjusting said incident angle based upon said reflection based upon a measurement of the received reflection by at least one of a photometer and a radiometer.

16. An apparatus for positioning a first device in relation to a second device, comprising an optical source affixed upon said first device, said optical source comprising a screen, said optical source to provide an incident light at an incident angle directed towards said second device from which a reflected light is received upon said screen, said apparatus being adapted to adjust the relative positioning between said first and second devices based upon the position of said reflected light on the screen by adjusting said incident angle, wherein said first device is testing device and wherein said first device is at least one of a photometer and a radiometer.

17. The apparatus of claim 16, wherein said screen comprises a plurality of markings to provide a location on said screen upon which said reflective light is received.

18. The apparatus of claim 17, wherein said apparatus further comprises means for providing a signal that is indicative of said location on said screen upon which the reflective light is received.

19. The apparatus of claim 16, wherein said reflective light is provided by a reflective material affixed upon said second device.

20. The apparatus of claim 16, wherein said second device is a computer display device.

21. The apparatus of claim 16, wherein said second device is a television display device.

22. The apparatus of claim 16, wherein said computer display device comprises a liquid crystal display (LCD) screen.

23. A system for testing a computer display, comprising:

a testing unit for performing a test upon said computer display, wherein said testing unit is at least one of a photometer and a radiometer;

an optical source affixed to said testing unit, said optical source for directing an incident light to said computer display; and a light receiving unit to receive reflective light reflected from said computer display, the location of said light receiving unit upon which said reflective light is received being used to adjust the positioning of said testing unit in relation to the computer display.

24. The system of claim 23, wherein said light receiving unit comprises a screen to receive said reflective light.

25. The system of claim 24, wherein said screen comprises a plurality of markings to provide a location on said screen upon which the reflective light is received.

26. The system of claim 23, wherein said computer display device comprises a liquid crystal display (LCD) screen.

27. The system of claim 23, further comprises a reflective material affixed upon said computer display for providing said reflective light.

* * * * *